(12) United States Patent
Ting et al.

(10) Patent No.: US 11,399,099 B2
(45) Date of Patent: *Jul. 26, 2022

(54) MOBILE ELECTRONIC COMMUNICATIONS USING INTERNET PROTOCOL

(71) Applicant: TextNow, Inc., Waterloo (CA)

(72) Inventors: Derek Ting, Waterloo (CA); Jonathan Lerner, San Francisco, CA (US)

(73) Assignee: TEXTNOW, INC., Waterloo (CA)

( * ) Notice: Subject to any disclaimer, the term of this patent is extended or adjusted under 35 U.S.C. 154(b) by 99 days.

This patent is subject to a terminal disclaimer.

(21) Appl. No.: 17/071,409

(22) Filed: Oct. 15, 2020

(65) Prior Publication Data
US 2021/0029252 A1    Jan. 28, 2021

Related U.S. Application Data

(63) Continuation of application No. 15/445,601, filed on Feb. 28, 2017, now Pat. No. 10,855,847, which is a
(Continued)

(51) Int. Cl.
H04M 7/00        (2006.01)
H04M 15/00       (2006.01)
(Continued)

(52) U.S. Cl.
CPC .......... *H04M 7/006* (2013.01); *H04L 61/157* (2013.01); *H04L 61/1588* (2013.01); *H04L 65/1006* (2013.01); *H04L 65/1069* (2013.01); *H04L 65/1076* (2013.01); *H04L 67/26* (2013.01); *H04M 7/0075* (2013.01); *H04M 15/56* (2013.01); *H04M 15/60* (2013.01); *H04M 15/8044* (2013.01); *H04M 17/02* (2013.01); *H04W 4/14* (2013.01); *H04W 84/12* (2013.01)

(58) Field of Classification Search
None
See application file for complete search history.

(56) References Cited

U.S. PATENT DOCUMENTS 6,707,813 B1   3/2004  Hasan et al.
7,046,658 B1   5/2006  Kundaje et al.
(Continued)

FOREIGN PATENT DOCUMENTS

WO   WO-2007016695 A2   2/2007

OTHER PUBLICATIONS

Final Rejection dated Sep. 8, 2016 for U.S. Appl. No. 14/314,209.
Non-Final Rejection (Office Action) dated Jul. 20, 2017, by USPTO, re U.S. Appl. No. 15/445,601. 14 pages.
(Continued)

*Primary Examiner* — Andrew C Oh
(74) *Attorney, Agent, or Firm* — Perry + Currier Inc.

(57) ABSTRACT

A database stores unique associations between account identifiers and mobile-network telephone numbers assigned by a mobile network to mobile communications devices. The account identifiers are also associated with voice-over-IP (VoIP) telephone numbers. Voice calls between the mobile communications devices are made as voice-over-IP (VoIP) calls using respective VoIP telephone numbers. Tracking of the VoIP calls is performed through the mobile network using respective mobile-network telephone numbers, so that a prepaid balance can be enforced.

8 Claims, 6 Drawing Sheets

Related U.S. Application Data continuation of application No. 14/314,209, filed on Jun. 25, 2014, now Pat. No. 9,621,735.

(51) Int. Cl.

| | |
|---|---|
| *H04L 65/1076* | (2022.01) |
| *H04L 65/1069* | (2022.01) |
| *H04L 61/4557* | (2022.01) |
| *H04L 61/4588* | (2022.01) |
| *H04M 17/02* | (2006.01) |
| *H04L 65/10* | (2022.01) |
| *H04L 67/55* | (2022.01) |
| *H04W 4/14* | (2009.01) |
| *H04W 84/12* | (2009.01) |

(56) References Cited

U.S. PATENT DOCUMENTS

| | | | |
|---|---|---|---|
| 7,266,113 B2 | 9/2007 | Wyatt | |
| 7,274,950 B2 | 9/2007 | Castrogiovanni et al. | |
| 7,310,415 B1 | 12/2007 | Short | |
| 7,489,687 B2 | 2/2009 | Chavez et al. | |
| 7,660,580 B2* | 2/2010 | Jiang | H04Q 3/0029 |
| | | | 455/433 |
| 7,822,188 B1 | 10/2010 | Kirchhoff et al. | |
| 7,839,982 B2 | 11/2010 | Dalrymple et al. | |
| 7,899,174 B1 | 3/2011 | Constantinof | |
| 7,917,395 B2 | 3/2011 | Crawford et al. | |
| 8,036,211 B1 | 10/2011 | Leeder et al. | |
| 8,036,356 B1 | 10/2011 | Ghosh et al. | |
| 8,139,564 B1 | 3/2012 | Weaver et al. | |
| 8,228,861 B1 | 7/2012 | Nix | |
| 8,315,589 B2 | 11/2012 | Li et al. | |
| 8,340,633 B1* | 12/2012 | Rege | H04M 15/28 |
| | | | 455/406 |
| 8,369,311 B1* | 2/2013 | Kirchhoff | H04M 3/42263 |
| | | | 370/352 |
| 8,472,430 B2 | 6/2013 | Milstein et al. | |
| 8,554,168 B1 | 10/2013 | Bonner et al. | |
| 8,559,601 B2 | 10/2013 | Coster et al. | |
| 8,666,367 B2* | 3/2014 | Sharp | G06F 9/4843 |
| | | | 701/472 |
| 8,781,442 B1 | 7/2014 | Link, II | |
| 8,855,107 B1* | 10/2014 | Kirchhoff | H04M 3/46 |
| | | | 370/352 |
| 9,456,083 B1 | 9/2016 | Ouimette | |
| 9,621,735 B2 | 4/2017 | Ting et al. | |
| 9,681,360 B1* | 6/2017 | Salyers | H04W 12/64 |
| 9,838,991 B1* | 12/2017 | Campbell | H04W 60/00 |
| 9,864,981 B1* | 1/2018 | Young | G06Q 40/128 |
| 10,582,043 B1* | 3/2020 | Eichhorn | H04M 1/575 |
| 10,855,847 B2* | 12/2020 | Ting | H04M 7/0075 |
| 2002/0013849 A1 | 1/2002 | Schweitzer et al. | |
| 2002/0176378 A1 | 11/2002 | Hamilton et al. | |
| 2003/0133552 A1 | 7/2003 | Pillai et al. | |
| 2003/0143978 A1* | 7/2003 | Cooper | H04M 15/00 |
| | | | 455/406 |
| 2004/0008645 A1 | 1/2004 | Janevski et al. | |
| 2004/0057429 A1 | 3/2004 | Marklund | |
| 2004/0153518 A1* | 8/2004 | Seligmann | H04L 12/5692 |
| | | | 709/206 |
| 2005/0059400 A1* | 3/2005 | Jagadeesan | H04W 36/30 |
| | | | 455/67.11 |
| 2005/0117566 A1* | 6/2005 | Davidson | H04W 88/06 |
| | | | 370/352 |
| 2005/0153698 A1* | 7/2005 | Sahim | H04L 65/1043 |
| | | | 455/444 |
| 2006/0084410 A1 | 4/2006 | Sutaria et al. | |
| 2006/0104203 A1 | 5/2006 | Krantz et al. | |
| 2006/0116105 A1 | 6/2006 | Frankel et al. | |
| 2006/0187850 A1 | 8/2006 | Ward et al. | |
| 2006/0187904 A1 | 8/2006 | Oouchi | |
| 2006/0193344 A1 | 8/2006 | Nie et al. | |
| 2006/0229090 A1 | 10/2006 | LaDue | |
| 2006/0246909 A1* | 11/2006 | Petermann | H04W 16/26 |
| | | | 370/279 |
| 2006/0268781 A1 | 11/2006 | Svensson et al. | |
| 2007/0002856 A1 | 1/2007 | Aoyama et al. | |
| 2007/0008893 A1 | 1/2007 | Singh et al. | |
| 2007/0008937 A1 | 1/2007 | Mody et al. | |
| 2007/0015536 A1 | 1/2007 | LaBauve et al. | |
| 2007/0025270 A1 | 2/2007 | Sylvain | |
| 2007/0043676 A1 | 2/2007 | Gao et al. | |
| 2007/0076696 A1 | 4/2007 | An et al. | |
| 2007/0104224 A1 | 5/2007 | Conner et al. | |
| 2007/0127400 A1 | 6/2007 | McKibben et al. | |
| 2007/0189220 A1 | 8/2007 | Oberle et al. | |
| 2007/0211767 A1* | 9/2007 | Todd | H04L 47/36 |
| | | | 370/508 |
| 2007/0244752 A1 | 10/2007 | Bayne | |
| 2007/0253412 A1 | 11/2007 | Batterman et al. | |
| 2008/0014956 A1 | 1/2008 | Balasubramanian | |
| 2008/0031212 A1 | 2/2008 | Ogura | |
| 2008/0046580 A1* | 2/2008 | Lafuente | H04M 15/00 |
| | | | 709/229 |
| 2008/0062985 A1* | 3/2008 | Agarwal | H04L 65/1046 |
| | | | 370/392 |
| 2008/0089327 A1 | 4/2008 | Lu et al. | |
| 2008/0090546 A1 | 4/2008 | Dickinson et al. | |
| 2008/0114669 A1 | 5/2008 | O'Neil et al. | |
| 2008/0127320 A1 | 5/2008 | De Lutiis et al. | |
| 2008/0181179 A1 | 7/2008 | Karaoguz | |
| 2008/0200142 A1* | 8/2008 | Abdel-Kader | H04M 11/04 |
| | | | 455/404.2 |
| 2008/0228654 A1 | 9/2008 | Edge | |
| 2008/0243725 A1 | 10/2008 | Homan-Muise et al. | |
| 2008/0281695 A1 | 11/2008 | Whitehead | |
| 2009/0103700 A1 | 4/2009 | Aguirre et al. | |
| 2009/0109893 A1 | 4/2009 | Gopal | |
| 2009/0156208 A1 | 6/2009 | Vesterinen et al. | |
| 2009/0180440 A1 | 7/2009 | Sengupta et al. | |
| 2009/0196268 A1 | 8/2009 | Caldwell et al. | |
| 2009/0262716 A1 | 10/2009 | Kawakami | |
| 2009/0262733 A1 | 10/2009 | Olson | |
| 2009/0264097 A1 | 10/2009 | Cai et al. | |
| 2009/0274284 A1 | 11/2009 | Arsenault et al. | |
| 2009/0285175 A1 | 11/2009 | Nix | |
| 2010/0041369 A1 | 2/2010 | Narayan et al. | |
| 2010/0150102 A1 | 6/2010 | Li et al. | |
| 2010/0166170 A1 | 7/2010 | East et al. | |
| 2010/0177662 A1 | 7/2010 | Meincke et al. | |
| 2010/0182994 A1 | 7/2010 | Rahman et al. | |
| 2010/0211666 A1 | 8/2010 | Kvernvik et al. | |
| 2010/0324996 A1 | 12/2010 | Kim et al. | |
| 2011/0038468 A1 | 2/2011 | Hannan et al. | |
| 2011/0040881 A1 | 2/2011 | Coulas et al. | |
| 2011/0065426 A1 | 3/2011 | Bae et al. | |
| 2011/0069679 A1 | 3/2011 | Onishi et al. | |
| 2011/0075828 A1* | 3/2011 | Okita | H04M 3/2218 |
| | | | 379/201.02 |
| 2011/0196978 A1 | 8/2011 | Toyama et al. | |
| 2011/0199962 A1 | 8/2011 | Kahn et al. | |
| 2011/0255677 A1 | 10/2011 | Kasad | |
| 2011/0319089 A1 | 12/2011 | Sharma et al. | |
| 2012/0121075 A1 | 5/2012 | Strasters | |
| 2012/0130898 A1 | 5/2012 | Snyder et al. | |
| 2012/0173736 A1 | 7/2012 | Klein | |
| 2012/0195236 A1 | 8/2012 | Knight | |
| 2012/0328090 A1 | 12/2012 | Macwan et al. | |
| 2013/0054428 A1 | 2/2013 | Shaikh | |
| 2013/0128883 A1* | 5/2013 | Lawson | H04M 7/003 |
| | | | 370/352 |
| 2013/0132854 A1* | 5/2013 | Raleigh | H04M 15/77 |
| | | | 715/738 |
| 2013/0176895 A1 | 7/2013 | McEachern et al. | |
| 2013/0316703 A1 | 11/2013 | Girard et al. | |
| 2013/0343246 A1 | 12/2013 | Manyakin, Jr. et al. | |
| 2014/0002576 A1 | 1/2014 | Kaza et al. | |
| 2014/0003261 A1* | 1/2014 | Gillett | H04W 36/30 |
| | | | 370/252 |
| 2014/0003405 A1 | 1/2014 | Gillett et al. | |

(56) References Cited

U.S. PATENT DOCUMENTS

| | | | |
|---|---|---|---|
| 2014/0004886 A1* | 1/2014 | Gillett | H04W 48/18 |
| | | | 455/456.6 |
| 2014/0031003 A1 | 1/2014 | Shugart et al. | |
| 2014/0092731 A1 | 4/2014 | Gupta | |
| 2014/0153480 A1 | 6/2014 | Doradla et al. | |
| 2014/0162693 A1 | 6/2014 | Wachter et al. | |
| 2014/0211700 A1* | 7/2014 | Anson | H04W 4/16 |
| | | | 370/329 |
| 2014/0254574 A1 | 9/2014 | Schreuder | |
| 2014/0258434 A1 | 9/2014 | Hong et al. | |
| 2014/0269625 A1 | 9/2014 | Surface et al. | |
| 2014/0307589 A1 | 10/2014 | Li et al. | |
| 2014/0328190 A1 | 11/2014 | Lord et al. | |
| 2014/0341083 A1 | 11/2014 | Shim et al. | |
| 2015/0045074 A1 | 2/2015 | Wong et al. | |
| 2015/0073987 A1 | 3/2015 | Dutt | |
| 2015/0149643 A1 | 5/2015 | Hu et al. | |
| 2015/0288820 A1 | 10/2015 | Xie | |
| 2015/0304201 A1 | 10/2015 | Onishi et al. | |
| 2015/0356630 A1* | 12/2015 | Hussain | G06Q 30/0273 |
| | | | 705/14.69 |
| 2015/0370858 A1 | 12/2015 | Lafuente Alvarez et al. | |
| 2015/0373478 A1 | 12/2015 | Ramraz et al. | |
| 2015/0381666 A1 | 12/2015 | Rustogi | |
| 2015/0381820 A1* | 12/2015 | Ting | H04L 65/1076 |
| | | | 370/259 |
| 2016/0007236 A1 | 1/2016 | Roeland et al. | |
| 2016/0135020 A1 | 5/2016 | Moshir et al. | |
| 2017/0111835 A1* | 4/2017 | Chandrasekaran | H04L 65/602 |
| 2017/0220968 A1* | 8/2017 | Lugo | H04W 4/08 |
| 2019/0132903 A1* | 5/2019 | Suxena | G01S 19/48 |

OTHER PUBLICATIONS

Final Rejection (Office Action) dated Oct. 6, 2017, by USPTO, re U.S. Appl. No. 15/445,601.
USPTO, Non-Final Rejection, dated Mar. 28, 2018, re U.S. Appl. No. 15/445,601.
USPTO, Final Rejection, dated Oct. 9, 2018, re U.S. Appl. No. 15/445,601.
USPTO, Advisory Action, dated Mar. 18, 2019, re U.S. Appl. No. 15/445,601.
USPTO, Non-Final Rejection, dated Jun. 6, 2019, re U.S. Appl. No. 15/445,601.
USPTO, Non-Final Rejection, dated Dec. 12, 2019, re U.S. Appl. No. 15/445,601.
Notice of Allowance and Fee(s) Due dated Dec. 7, 2016 for U.S. Appl. No. 14/314,209.
Non-Final Rejection dated Feb. 11, 2016 for U.S. Appl. No. 14/314,209.
Vodafone, Support Article: Recharge your account to keep it active, http://support.vodafone.com.au/articles/FAQ/What-happens-to-my-prepaid-service-if-I-don-t-recharge. Retrieved on Oct. 9, 2014.
Fido, Support Article: Insufficient balance impacts, http://www.fido.ca/web/content/account/low_insufficient_balance_impacts. Retrieved on Oct. 9, 2014.
Google Play Store, Onavo Count Data Usage App product page, https://play.google.com/store/apps/details?id=com.onavo.android.onavoid&hl=en, Sep. 9, 2014. Retrieved on Oct. 9, 2014.
Metropcs, Support and FAQs "Frequently Asked Questions: joyn Wi-Fi Calling", www.metropcs.com. Retrieved on Jan. 17, 2014.
Packetizer, VoIP Bandwidth Calculator, http://www.bandcalc.com/, Feb. 17, 2008. Retrieved on Oct. 10, 2014.
Westbay Engineers Limited, Tool: Erlang Call Minutes Calculator, http://www.erlang.com/calculator/mins/, Jan. 7, 2014. Retrieved on Oct. 9, 2014.

* cited by examiner

MOBILE ELECTRONIC COMMUNICATIONS USING INTERNET PROTOCOL

FIELD

The present invention relates to electronic communications.

BACKGROUND

Mobile communications technologies are continually evolving. It is common for mobile networks (e.g., cellular telephone networks) to support multiple different protocols and standards, as mobile operators transition to newer technologies. Transition is gradual, and older technologies tend to stay in service to support users who lack the impetus or finances to upgrade to newer technologies. However, such users could benefit from newer technologies if such were readily available to them. In addition, the need to support various protocols and standards adds complexity and cost for mobile operators, their direct customers, and mobile virtual network operators (MNVOs).

SUMMARY

According to one aspect of the present invention an electronic communications system includes a mobile network for providing mobile communication between a plurality of mobile communications devices based on mobile-network telephone numbers associated with plurality of the mobile communications devices. The mobile network supports at least one mobile-network protocol and an Internet Protocol (IP). The electronic communications system further includes a wireless local-area network (WLAN) for providing WLAN communication between the plurality of mobile communications devices and a wide-area IP network. The WLAN operates on at least the Internet Protocol. The electronic communications system further includes a communications routing system coupled to the mobile network and coupled to the WLAN via the wide-area IP network. The communications routing system operates on the Internet Protocol. The communications routing system includes at least one database storing a plurality of unique associations between account identifiers and the mobile-network telephone numbers, and further between the account identifiers and voice-over-IP (VoIP) telephone numbers. The communications routing system further includes a routing engine responsive to incoming communications events including initiation of voice calls, ending of voice calls, and communication of short message service (SMS) messages. The routing engine is configured to initiate and end voice calls between the plurality of mobile communications devices as voice-over-IP (VoIP) calls using respective VoIP telephone numbers. The routing engine is further configured to track VoIP calls made through the mobile network using respective mobile-network telephone numbers.

According to another aspect of the present invention, a communications routing system coupled to a mobile network and coupled to a wireless local-area network (WLAN) via a wide-area Internet Protocol (IP) network includes at least one database storing a plurality of unique associations between account identifiers and mobile-network telephone numbers assigned by the mobile network to a plurality of mobile communications devices, and further between the account identifiers and voice-over-IP (VoIP) telephone numbers. The communications routing system further includes a routing engine responsive to incoming communications events including initiation of voice calls, ending of voice calls, and communication of short message service (SMS) messages. The routing engine is configured to initiate and end voice calls between the plurality of mobile communications devices as voice-over-IP (VoIP) calls using respective VoIP telephone numbers. The routing engine is further configured to track VoIP calls made through the mobile network using respective mobile-network telephone numbers.

According to another aspect of the present invention, a method for electronic communications includes storing in at least one database a plurality of unique associations between account identifiers and mobile-network telephone numbers assigned by a mobile network to a plurality of mobile communications devices, and further between the account identifiers and voice-over-IP (VoIP) telephone numbers. The method further includes initiating and ending voice calls between the plurality of mobile communications devices as voice-over-IP (VoIP) calls using respective VoIP telephone numbers, and tracking VoIP calls made through the mobile network using respective mobile-network telephone numbers.

BRIEF DESCRIPTION OF THE DRAWINGS

The drawings illustrate, by way of example only, implementations of the present invention.

DETAILED. DESCRIPTION

The present invention generally relates to providing wireless carrier services (e.g., voice calls, short message service or SMS messages, general data communications, etc.) over the Internet Protocol (IP). Substantially all communications between mobile devices are processed and routed over IP. While certain infrastructure may not operate under IP (e.g., PSTNs, cellular base station networks, etc.), communications are routed to and from such infrastructure using IP to the extent possible. The present invention also generally relates to synchronizing communications over several mobile or stationary devices operating under the same account, and tracking and managing prepaid balances for traditional carrier services (e.g., voice call minutes, SMS messages, etc.) that are routed, an may be delivered, over IP. Other aspects of the present invention will also become apparent in light of the following detailed description.

Figure 1:
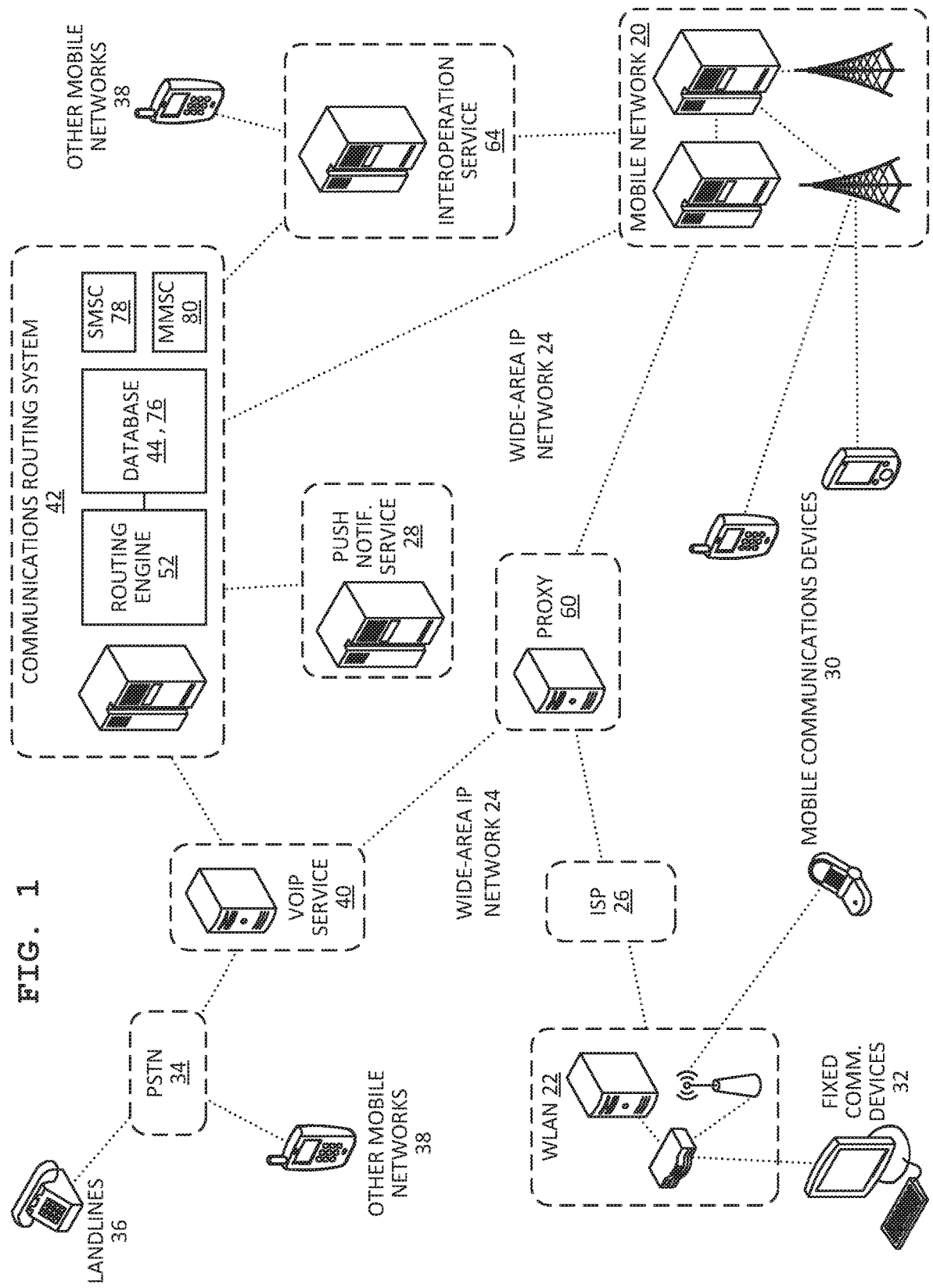
FIG. 1 is a schematic diagram of an overall communications system.

FIG. 1 shows an example of an overall electronic communications system.

The system includes a mobile network 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides voice, data, and SMS services.

The system further includes at least one wireless local-area network (WLAN) 22 that operates under one or more known standards and technologies, such as IEEE 802.11.

The mobile network 20 and the WLAN 22 each connect to a wide-area IP network 24, such as the Internet. The WLAN 22 can be connected to the wide-area IP network 24 by an Internet service provider (ISP) 26 or the similar entity. The mobile network 20 can be connected to the wide-area IP network 24 by a packet data interface.

The system can further include a push notification service 28, such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

One or more stationary communications devices 32, such as a desktop computer, server, or similar, can also connect to the WLAN 22, via a router or wired access point.

The system can further be connected to a public switched telephone networks (PSTN) 34 that supports correction to a plurality of landline telephones 36 and additional mobile networks 38. The additional mobile networks 38 may have the same or similar features of the mobile network 20 and may be operated by different carriers and/or operated according to different technologies and standards when compared to the mobile network 20.

The system further includes at least one voice-over-IP (VoIP) service 40, which can be configured to manage IP data streams related to VoIP communications. The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines 36 and wireless devices in the additional mobile networks 38. In some implementations, the VoIP service 40 is a subcomponent of the mobile network 20.

The system further includes a communications routing system 42 connected to the VoIP service 40, the push notification service 28, and the mobile network 20 via the wide-area IP network 24. In some implementations, the VoIP service 40 is directly connected to the communications routing system 42 via a local IP network distinct from the wide-area IP network 24. The communications routing system 42 is configured to route communications of disparate types between mobile communications devices 30 via the mobile network 20 and the WLAN 22.

The system can further include a proxy 60 connected to the communications routing system 42, the WLAN 22, and the mobile network 20 via the wide-area IP network 24. In some implementations, the communications routing system 42 and the mobile communications devices 30 can be configured to route communications events through the proxy 60. The proxy 60 can be configured to handle VoIP call handoffs, as an alternative to the communications routing system 42 handling such. In addition, the proxy 60 can be configured to prioritize communications events associated with the enhanced 911 system, as an alternative to the communications routing system 42 doing so. For example, the proxy 60 can control quality of service (QoS) settings for various communications, so that 911 calls are prioritized. In some implementations the VoIP service 40 is configured to route all relevant VoIP data through the proxy 60. A suitable proxy service can be in the form of that available from Pravala Networks Inc., of Kitchener, Ontario, Canada.

The system can further include an interoperation service 64 connecting the communications routing system 42 to the mobile network 20 via the wide-area IP network 24. The communications routing system 42 can be connected to the interoperation service 64 via a virtual private network (VPN) established over the wide-area IP network 24. The interoperation service 64 is configured to interface with the various mobile networks 20, 38. The interoperation service 64 facilitates data communications between the communications routing system 42 and the mobile network 20. The interoperation service 64 further facilitates messaging services, such as SMS and MMS, between the communications routing system 42 and the additional mobile networks 38. The interoperation service 64 can be the kind provided by Syniverse of Tampa, Fla.

The communications routing system 42 includes at least one database, such as an accounts database 44 and one or more user data databases 76, configured to store a plurality of associations between unique account identifiers (e.g., user names) and mobile-network identifiers 46 supported by the mobile network 20, such as mobile directory numbers (MDNs, or telephone numbers). For each user name, the database 44, 76 can store a first MDN for SMS/MMS messages and VoIP calls and a second MDN for services on the mobile network 20. The first and second MDNs are district and mutually different. The first MDN is used at the VoIP service 40 and the communications routing system 42 for VoIP calls. The first MDN is also used at the interoperation service 64 and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communication device 30, with the communications routing system 42 using the second MDNs to map data usage to particular accounts. The database 44, 76 may further store push tokens to identify mobile communications devices 30 via the push notification service 28, so that the communications routing system 42 can send push notifications to the mobile communications devices 30. Alternatively or additionally, the database 44, 76 may store currently assigned IP addresses for the mobile communications devices 30.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

The communications routing system 42 further includes a routing engine 52 responsive to incoming communications events. Incoming communications events can include initiation of voice calls ending of voice calls, communication of SMS/MMS messages, requests for data. The routing engine 52 is further configured to route data communications between the plurality of mobile communications devices 30 over the mobile network 20 and the WLAN 22 using the Internet Protocol. The routing engine 52 is further configured to initiate and end voice calls between mobile communications devices 30 as VoIP calls using the VoIP server 40, and to communicate SMS messages between the plurality of mobile communications devices 30 via the mobile network 20 and the WLAN 22 using the Internet Protocol.

The communications routing system 42 can further include a short message service center (SMSC) 78 and a multimedia message service center (MMSC) 80 configured to store, forward, convert and deliver SMS and MMS messages between the communications routing system 42 and the interoperation service 64. The SMSC 78 and MMSC 80 can be configured to communicate with the interoperation service 64 using the Short Message Peer-to-Peer (SMPP) protocol.

Each mobile communications device 30 can be associated with one of the unique account identifiers (e.g., user names) stored in the database 44, 76. This can be achieved by, for example, a client program executed on the mobile communications device 30 requiring a user log in (e.g., client 121 of FIG. 4). When a user is logged in to the client program, the mobile communications device 30 becomes associated with the respective unique account identifier.

Each account identifier can be associated with a second mobile-network identifier, such as a first MDN that is associated with the VoIP service 40. Each account identifier can be associated with a second mobile-network identifier, such as an MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account voice services via the VoIP server 40 are conducted with one MDN and data services are conducted via the mobile network using a different MDN. The communications routing system 42 maps each MDN to a particular account for managing overall services to that account.

An outgoing voice call from a mobile communications device 30 is conducted as follows. The mobile communications device 30 sends a call request to the VoIP service 40 via the WEAN 22, if connected, or otherwise via the mobile network 20. The mobile communications device 30 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device through the push notification service 28 to notify the destination device of the call. Then the destination device, which is one of the mobile communications devices 30, registers with the VoIP service 40, if not already registered, and notifies the VoIP service 40 of call acceptance. The VoIP service 40 can notify the communications routing system 42 of call initiation and ending. When the proxy 60 is used, VoIP voice data is routed through the proxy 60.

The mobile communications devices 30 can perform SIP registrations in a variety of ways.

For mobile communications devices 30 operating on iOS by Apple Inc., the mobile communication device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communication device 30 can be configured to perform a SIP registration in response to receiving a push notification for an incoming call. That is, the SIP registration process can be started before the user has accepted the call.

Incoming calls to the mobile communications devices 30 arrive at the VoIP service 40 via the PSTN 34. The VoIP service 40 notifies the communications routing system 42 of a call request for a particular destination mobile communications device 30. The communications routing system 42 then issues a push notification to the destination mobile communications device 30 through the push notification service 28 to notify the destination mobile communications device 30 of the call. If the user of the destination mobile communications device 30 accepts the call, then the destination mobile communications device 30 registers with the VoIP service 40, if not already registered, and notifies the VoIP service 40 of call acceptance. The VoIP service 40 can notify the communications routing system 42 of call initiation and ending.

Incoming and outgoing calls made to or from a mobile communications device 30 associated with the communications routing system 42 are made using the first MDN, which is established at the VoIP service 40. When such a call is conducted as data via the mobile network 20, the second MDN of the relevant mobile communications device 30 is used to track the data usage on the mobile network 20.

In some embodiments, caller ID is based on the VoIP MDN to the exclusion of the mobile network MDN. That is, the mobile network MDN is for tracking data usage only, and the VoIP MDN is the basis for outgoing and incoming calls.

An outgoing SMS/MMS message can be sent by a mobile communications device 30 as follows. One or more IP data packets containing the SMS/MMS message are sent from the mobile communications device 30 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a mobile communications device 30 associated with the communications routing system 42. If the destination device is a mobile communications device 30 associated with the communications routing system 42, then the communications routing system 42 stores the message and sends a push notification to the destination mobile communications device 30 via the push notification service 28. When a user at the destination mobile communications device 30 opens an SMS/MMS application/module or performs a similar action, the destination mobile communications device 30 fetches the stored message from the communications routing system 42. If the destination device is not associated with the communications routing system 42, then the communications routing system 42 sends the SMS/MMS message to the destination device via the interoperation service 64.

Incoming SMS/MMS messages for the mobile communications devices 30 arrive at the communications routing system 42 either directly from other mobile communications devices 30 that have accounts at the communications routing system 42 or via the interoperation service 64 for devices that are not associated with the communications routing system 42. The communications routing system 42 stores a particular SMS/MMS message and sends a push notification to the destination mobile communications device 30 via the push notification service 28. When a user at the destination mobile communications device 30 opens an SMS/MMS application/module or performs a similar action, the destination mobile communications device 30 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Data communications between mobile communications devices 30 and between mobile communications devices 30 and data sources, such as web sites connected to the wide-area IP network 24, are performed via the WLAN 22, if connected, and otherwise via the mobile network 20.

Figure 2:
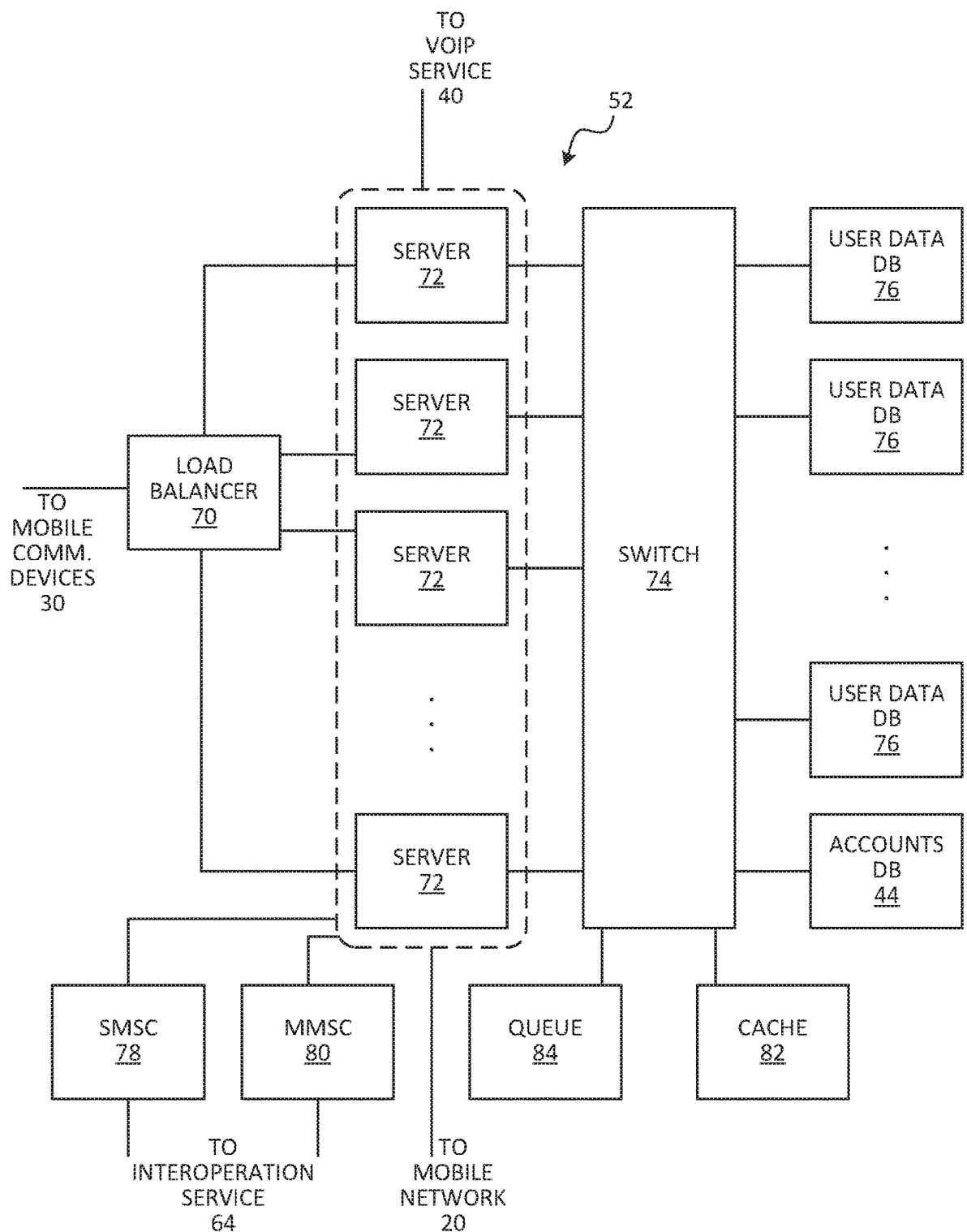
FIG. 2 is a schematic diagram of a communications routing system.

FIG. 2 shows a diagram of the communications routing system 42. The communications routing system 42 includes a load balancer 70, a plurality of servers 72, a switch 74, a plurality of user data databases 76, and the accounts database 44. The load balancer 70, servers 72, and switch 74 can be considered the routing engine 52. However, this is not limiting.

Mobile communications devices 30 connect to the load balancer 70 via the wide-area IP network 24 using a protocol, such as HTTP, HTTPS, or the like. The load balancer 70 is configured to balance requests from the mobile communications devices 30 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service 64 using, for example, the SMPP protocol and the MM4 protocol. The SMSC 78 and MMSC 80 can be configured to connect to the interoperation service 64 via a suitable binding and through a VPN tunnel. The SMSC 78 and MMSC 80 expose an API to the routing engine 52, such that the routing engine 52 can use the API to send outgoing SMS/MMS messages. For incoming messages, the SMSC 78 and MMSC 80 are configured to invoke an API of the routing engine 52 to cause the routing engine 52 to store a received message and send a notification of the message to the destination mobile communications device 30.

The switch 74 connects the servers 72 to the user data databases 76, the accounts database 44, a cache 82, and a queue 84.

The user data databases 76 store data for each of the users identified in the accounts database 44. Such user data can include the mobile network MDN, session ID, password, residential address, contacts, sessions, in-app purchases subscriptions, settings, balance information, and communications events including call histories, SMS/MMS message transmission histories, and SMS/MMS message content. The user data databases 76 can be configured to store communications event histories for all user names in the accounts database 44, such that a particular user's history can be downloaded to any communications device 30 with which the user logs in. The user data databases 76 can be implemented as database shards.

The cache 82 can be checked for data prior to requesting data from the user data databases 76. In addition, requests can be queued in the queue 84, which can be implemented using Redis or similar technology.

The accounts database 44 stores the identity 75 of the user data database 76 that stores the user data associated with each account identifier (user name), and can further store the VoIP MDN for each user.

Figure 3:
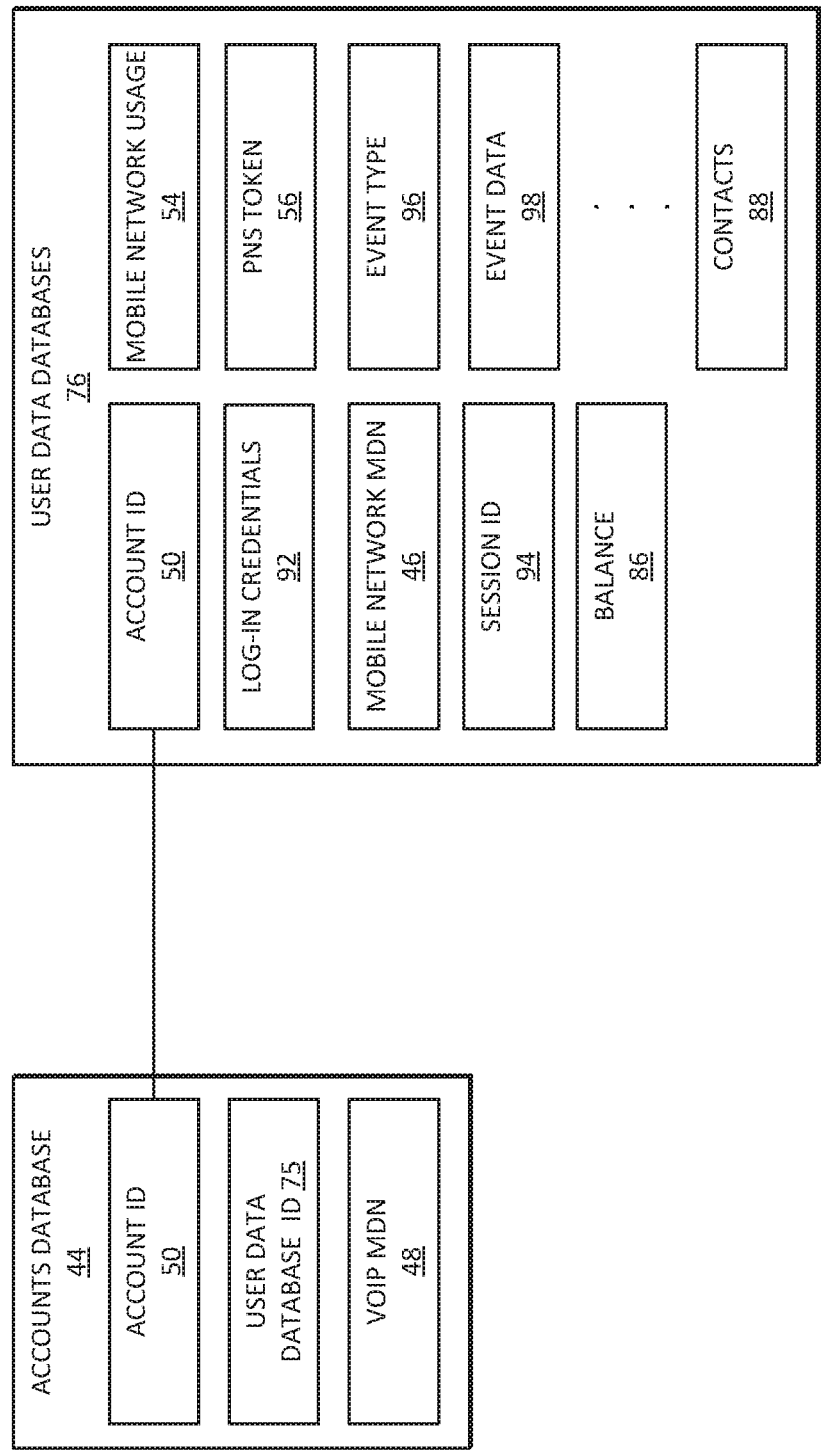
FIG. 3 is a diagram of a data structure used by a communications routing system of the overall system.

FIG. 3 shows a data structure that can be used for the communications routing system 42. The data structure may be used to store relevant data at the communications routing system 42 and communicate such data to and from the communications routing system 42.

The accounts database 44 associates account identifiers 50 with user data database identifier 75. The accounts database 76 further associates VoIP identifier 48 (e.g., VoIP MDN) with account identifier 50 (e.g., user name).

The user data database 76 associates mobile network identifier 46 (e.g., mobile network MDN) and mobile network usage 54 with account identifier 50. The user data database 76 can also associate push notification token 56 with account identifier 50.

Some of the data stored within the user data database 76 represents a communications history that can include indications of communications events including call histories, SMS/MMS message transmission histories, and SMS/MMS message content. The routing engine 52 writes indications of communications events to the user data database 76 in response to incoming communications events. In some implementations, the user data database 76 can further store indications of website access, chat messages/history, audio/video stream access, voicemail, chat/MMS images, email attachments, among other data events. Communications events may be associated with to remote storage, such as that provided by Amazon. In particular, binary assets associated with communications events (e.g., MMS images) can be stored remotely, with the user data database 76 storing unique identifiers, such as URIs, identifying the locations of the binary assets.

Communications events are handled based on various identifiers, with the account identifier 50 acting as a master identifier for the communications routing system 42. The routing engine 52 receives such communications events from mobile communications devices 30 via the wide-area IP network 24. Hence, a core principle of operation of the routing engine 52 is to identify the source of a received communications event and identify a destination, if any, for the communications event. Actions discussed herein with respect to the account identifier 50 can be performed based on the associated session identifier 94.

Initially, a user logs in to a client program at one of the mobile communications devices 30. This can be achieved using log-in credentials 92 that are stored at and verified by the communications routing system 42. Each account identifier 50 is associated with a set of log-in credentials 92, and this can be implemented as a user name and password combination. The routing engine 52 can be configured to respond to a log-in communications event, bearing an account identifier 50 and user-entered log-in credentials, by verifying the user-entered log-in credentials with the credentials 92 stored at the communications routing system 42 to authenticate the user to the account identifier 50.

Responsive to a successful authentication, the routing engine 52 can initiate a session. The session identifier 94 can be stored at the communications routing system 42, such as in the user data database 76, as well as at the mobile communications device 30 to be used with successive communications events to identify the relevant account.

The session identifier 94 is used by the mobile communications device 30 to communicate with the communications routing system 42 to initiate communications events and obtain or modify data stored in the user data database 76. In some implementations, the push notification token 56 is used for downlink communications from the communications routing system 42 to the mobile communications device 30, and the push notification service 28 (FIG. 1) handles routing to the mobile communication device 30, In other implementations, regarding downlink communications, the accounts database 44 or user data database 76 can store network information that can specify an IP address, a media access control (MAC) address, a session identifier, a combination of such, or similar. For example, a persistent socket connection can be maintained between the communications routing system 42 and each mobile communication device 30. The routing engine 52 can be configured to use the network information when routing communications to the mobile communications device 30, so as to route to the correct one of the mobile network 20 and WLAN 22, depending on where the mobile communications device 30 was last seen.

Incoming communications events may specify one or more destination mobile communications device 30 using the VoIP identifier 48. When the routing engine 52 routes the communications event to a destination mobile communications device 30, the routing engine 52 can reference the databases 44, 76 to determine a destination account identifier 50, and thus the destination push notification token 56 or other network information for downlink communications.

The routing engine 52 writes indications of communications events to the user data database 76 in response to incoming communications events. Event type 82 as well as event data 98 can be stored. Event type 96 indicates the type of communications event, such as calls (e.g., placed, answered, missed ended), incoming and outgoing SMS messages, and similar. Event data 98 can include an account identifier 50 (or name, telephone number, etc.) of the other party, SMS message content, and the like. Hence, call histories, SMS message transmission histories, and SMS message content can be stored. In addition, any request or response for general data can be stored, as discussed above.

The user data database 76 can also store a prepaid balance 86 for each user account. Balance 86 may be stored as monetary amount, voice call time, data amount (e.g., GB), similar quantity, or a combination of such. The routing engine 52 can be configured to reduce prepaid balance 86 for a particular account identifier 50 based on mobile network usage 54, based on tracked times of VoIP calls (as tracked by the VoIP service 40 and/or the system 42), based on other usage metrics, or based a combination of such. In various implementations, the routing engine 52 can be configured to deny initiation of a voice call requested by a particular mobile communications device 30 associated with a depleted balance when the particular mobile communications device 30 is only connected to the mobile network 20, and not the WLAN 22. In various implementations, the routing engine 52 can allow a voice call requested by the particular mobile communications device 30 with the depleted balance when such device 30 is connected to the WLAN 22. Balances 86 can be increased based on purchase of prepaid credit via a designated type of communications event to which the routing engine 52 responds or via a web interface available via the wide-area IP network 24.

The communications routing system 42 can further store authentication information, as required by the mobile network 20 to permit access to mobile data service for the mobile communications devices 30. Such authentication information may include one or more parameters to maintain a secure direct connection, a pre-specified address/port, general log-in credentials, one or more certificates, a combination of such, or similar. The communications routing system 42 can access the mobile network 20 via an API exposed by the mobile network 20. Alternatively, a server in the mobile network 20 can access the communications routing system 42 via an API exposed by the communications routing system 42. Authentication information can be communicated between the routing engine 52 and the mobile network 20, as needed. In some implementations, the mobile network 20 sends mobile network usage 54 data for each mobile network MDN 46 periodically (e.g., every 5 minutes) via FTP to the communications routing system 42 for update at the user data database 76. A script at the communications routing system 42 can be configured to digest the mobile network usage 54 information and update the user data database 76 accordingly.

The data structure shown in FIG. 3 also includes contact information fields 88 stored in the user data database 76. Contact information fields 88 include names and other details of a user's contacts. Contacts information can include telephone number for each contact, which can be a VoIP MDN 48 (in-network contacts) or any other telephone number (out-of-network contacts). Other data as discussed elsewhere herein can also be stored in the user data database 76 and accounts database 44.

Figure 4:
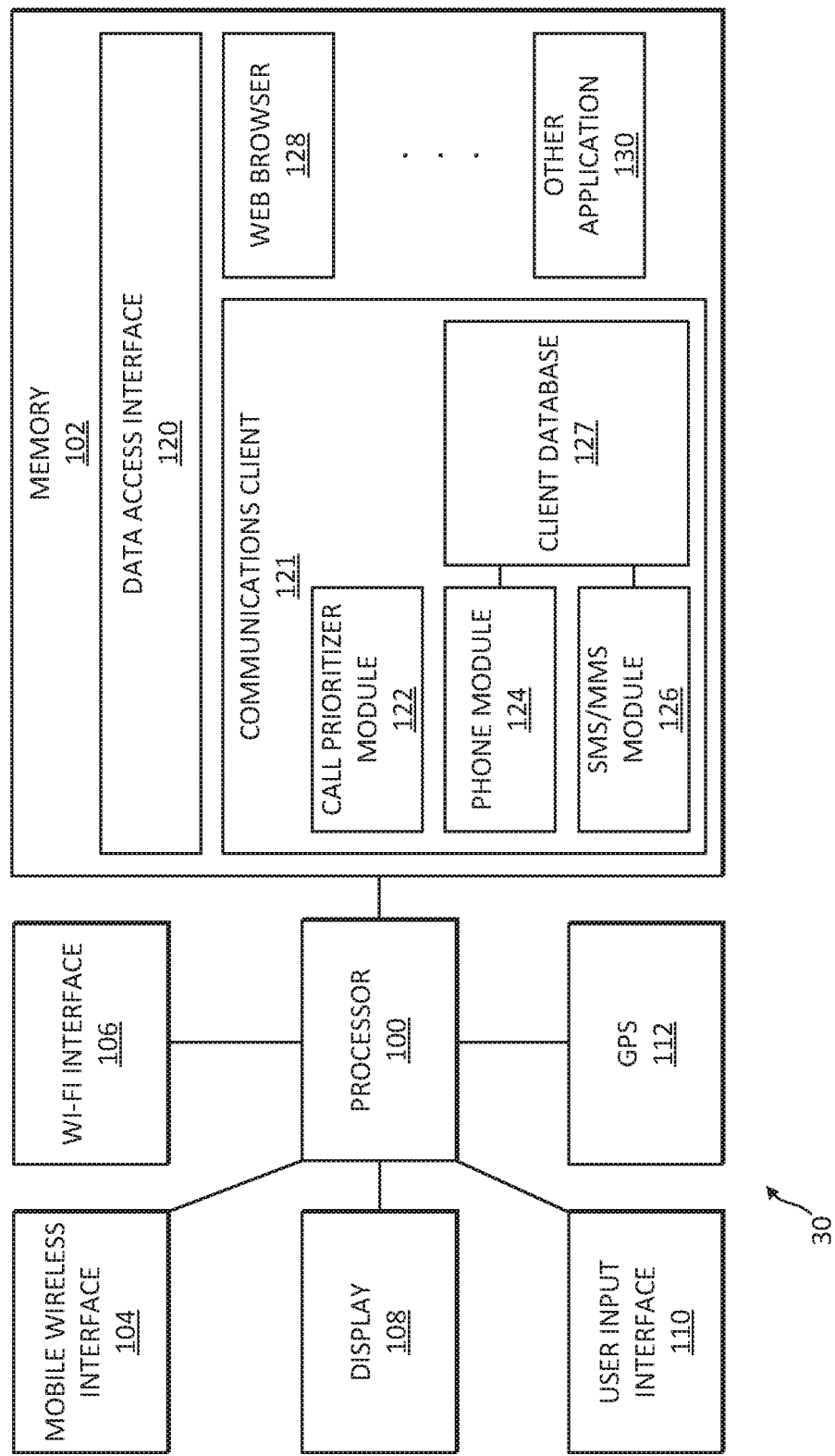
FIG. 4 is a block diagram of a mobile communications device operable with the communications routing system.

FIG. 4 shows a block diagram of a mobile communications device 30.

The mobile communications device 30 includes a processor 100, memory 102, a mobile wireless interface 104, an IEEE 802.11 (Wi-Fi) interface 106, a display 108, a user input interface 110, and a global-positioning system (GPS) chipset 112. The processor 100, memory 102, mobile wireless interface 104, Wi-Fi interface 106, display 108, user input interface 110, and GPS 112 are electrically interconnected and can be physically contained within a small, portable housing. The mobile communications device 30 can include other components, such as a battery, which are omitted from view for clarity. The mobile communications device 30 is an illustrative example of a smartphone or mobile phone suitable for use with the system discussed herein. Other examples should be apparent.

The processor 100 is configured to execute instructions, which may originate from the memory 102, the mobile wireless interface 104, or the Wi-Fi interface 106. The processor 100 may be known a CPU. The processor 100 can include one or more sub-processors or processing cores.

The memory 102 includes a non-transitory computer-readable medium that is configured to store programs and data. The memory 102 can include one or more short-term or long-term storage devices, such as a solid-state memory chip (e.g., DRAM, ROM, non-volatile flash memory), a hard drive, and similar. The memory 102 can include fixed components that are not physically removable from the mobile communications device 30 as well as removable components (e.g., removable memory cards). The memory 102 allows for random access, in that programs and data may be read and written.

The mobile wireless interface 104 can include a chipset, such as an LTE chipset or similar, and one or more antennas suitable for communication with the mobile network 20. Such a chipset may be only be configured for data communications. In some implementations, the mobile communications device 30 advantageously omits any chipset for known circuit-switched communications. The mobile wireless interface 104 may further include a subscriber identity module (SIM) card interface and SIM card, or similar device capable of storing a mobile identifier, such as an MDN.

The Wi-Fi interface 106 includes one or more adaptors and antennas configured to communicate with the WLAN 22. Such adaptors antenna can be compatible with one or more IEEE 802.11 protocols.

In various implementations described herein, selection of the mobile wireless interface 104 or the Wi-Fi interface 106 as the interface through which to conduct a VoIP call or communicate other communication events can be made by the VoIP service 40, the proxy 60, the push notification service 28, or the like.

The display 108 and user input interface 110 can include a touch-screen, speaker, microphone, keypad, and the like, suitable for user input and output of commands, voice, sound, images, video, and similar.

The GPS chipset 112 can include a suitable antenna and support circuitry for collecting GPS satellite signals and calculating position based on same.

A data access interface 120 is a client program stored in the memory 102 and executable by the processor 100. The data access interface 120 is configured to communicate with the communications routing system 42 by specifying an address, such as an IP address, of the communications routing system 42 on the wide-area IP network 24. The data access interface 120 can be configured to require authentication (e.g., via user name and password) with the communications routing system 42 before allowing other applications at the mobile communications device 30 access to the mobile network 20 or WLAN 22. The data access interface 120 is configured to communicate data with the mobile network 20 and the WLAN 22 via the respective interface 104, 106 and provide data services to applications.

A communications client program 121 is stored in the memory 102 and executable by the processor 100. The communications client program 121 can be configured to implement any or all of the client-side functionality discussed herein. The communications client program 121 can include a call prioritizer module 122, a phone module 124, an SMS/MMS module 126, and a client database 127. The communications client program 121 can be implemented using the model-view-controller (MVC) software architectural pattern.

The call prioritizer module 122 provides an interface to applications and modules traditionally associated with circuit-switched applications, such as a phone module 124 and an SMS/MMS module 126. The call prioritizer module 122 can be configured to assign priorities to requests made by other applications and modules. Such priorities can be mapped to QoS settings at the mobile network 20, the WLAN 22, and the proxy 60. For example, a 911 call made through the phone module 124 can be detected as such by the call prioritizer module 122 which is configured to assign maximum priority to such a call and to place such a call through any available network. As the mobile network 20 may only provide data services and/or the device 30 may lack a circuit-switched chipset, the specified priority is passed to the data access interface 120, which passes same to the available network to ensure that the 911 call is given suitable network priority. The data access interface 120 may further be configured to provide GPS and other enhanced 911 information to the network during the emergency call.

In other embodiments in which a circuit-switched chipset and network (e.g., CDMA) are used, the call prioritizer module 122 is configured to route 911 calls through the circuit-switched network, and to provide GPS and other enhanced 911 information via the circuit-switched network.

The call prioritizer module 122 can also be configured to perform a speed test, using the proxy 60 if appropriate, to determine whether available data throughput rate is sufficient to make a VoIP call. The measured throughput rate can be a condition for allowing a VoIP call or can be used as input to configure an audio codec. In implementations that use a circuit-switched chipset, if a VoIP call is requested and the throughput rate is insufficient, then the call can be routed through the circuit-switched chipset.

The phone module 124 is a client program stored in the memory 102 and executable by the processor 100. The phone module 124 can be configured to support SIP (or other protocol) for call initiation and call ending for VoIP telephony. The phone module 124 can include a VoIP client, such as that available from Acrobits of Prague, Czech Republic. Generally, the phone module 124 can issue call commands and respond to call commands via the interfaces 104, 106, 120. For initiation of VoIP calls, the phone module 124 can be configured to perform a SIP registration with the VoIP service 40. For receiving VoIP calls under Android or similar operating system, the phone module 124 can be configured to respond to push notifications received via the interfaces 104, 106, 120 by initiating a SIP registration, so as to preserve battery life by avoiding unnecessary SIP registrations that may be otherwise needed for keep-alive SIP registration. Alternatively, the phone module 124 can be configured to periodically initiate a SIP registration. For receiving VoIP calls under iOS or similar operating system, the phone module 124 can be configured to initiate a SIP registration when control is passed to the communications client program 121, such as after the user has responded to a push notification alert. The phone module 124 can be configured to present a conventional circuit-switched mobile phone dialing and answering interface to the user. In some implementations, the phone module 124 and the call prioritizer module 122 can be distinct applications.

An SMS/MMS module 126 can be stored in the memory 102 and executable by the processor 100 to provide an interface for inputting, reading, sending, and receiving SMS (and optionally MMS) messages. The SMS/MMS module 126 accesses the mobile network 20 and WLAN 22 via the data access interface 120 and the respective interface 104, 106. The SMS/MMS module 126 can be configured to present a conventional circuit-switched SMS input and output interface to the user.

In some implementations, the phone module 124 and the SMS/MMS module 126 are distinct applications.

The client database 127 stores communications event data locally at the mobile communications device 30. As communications events are composed and sent from communications client program 121, local copies of such communications events can be stored in the client database 127 for reference by the user of the mobile communications device 30. Similarly, as communications events are received at the communications client program 121, local copies of such communications events can be stored in the client database 127 for reference by the user.

A web browser 128 and other applications 130 are client programs stored in the memory 102 and executable by the processor 100. The web browser 128 and other applications 130 are configured to use the data access interface 120 to communicate data with the mobile network 20 and the WLAN 22 via the respective interface 104, 106. Examples of other applications 30 include a chat application, an email application, a social networking client application, a video streaming application, and an Internet radio application. One or more of such applications may also be modules of the communications client program 121.

Figure 5:
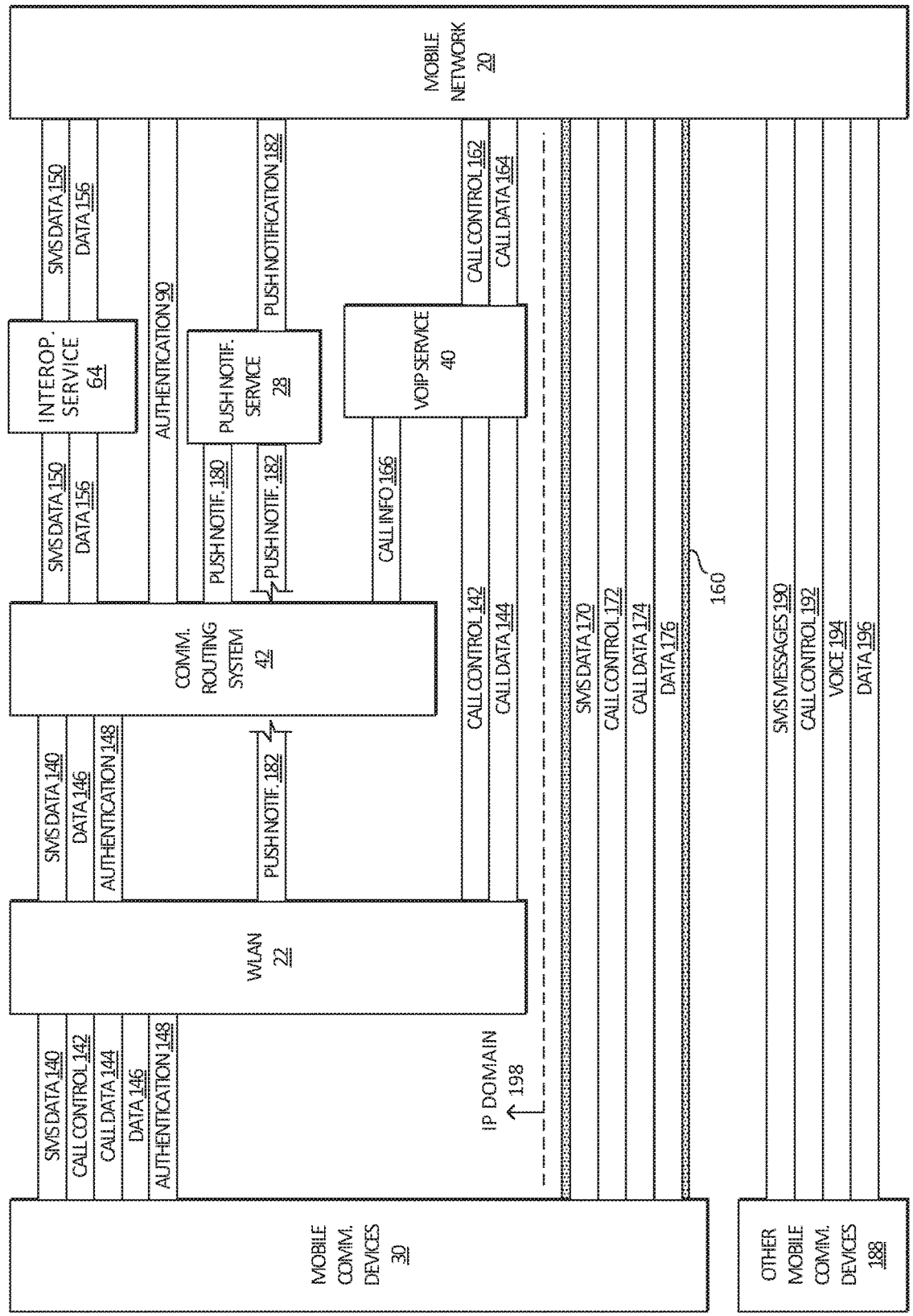
FIG. 5 is a diagram showing data and control flow within the overall system.

FIG. 5 illustrates data and control flow within the overall system described herein. For sake of explanation, the proxy 60 (FIG. 1) is omitted from this figure.

Mobile communications devices 30 communicate with the one or more WLANs 22 using the Internet Protocol. Such communications can include SMS data 140, call control commands 142, call data 144 and general data 146. Mobile communications devices 30 can be assigned a WLAN identifier, such as an IP address or other identifier discussed elsewhere herein, to facilitate such communication with the WLAN 22.

SMS data 140 can include source and destination indicators, such as telephone number, as well as message content. SMS data 140 is also representative of MMS data, when implemented. Because the SMS data 140 is transported using IP packets, the SMS data 140 can be provided in a data structure different from SMS standards, such as SMPP.

Call control commands 142 can include commands issued by a mobile communications device 30 to initiate or end a call with another mobile communications device 30, a stationary communications device 32 (FIG. 1), or a different type of mobile communications device 188, such as those not configured for communications routing via the communications routing system 42. Call control commands 142 can also include commands exchanged between the VoIP service 40 and a mobile communications device 30 to initiate or end a call. A call control command 142 can include a telephone number of a receiving party. Call control commands 142 can flow in either direction and can include SIP commands.

Call data 144 includes VoIP data carrying audio information, such as digitized voice signals, that is the VoIP call itself. Call data 144 flows bidirectionally between the mobile communications devices 30 and the WLAN 22. Various codecs, such as Opus, can be used.

General data 146 includes other kinds of data and control information, including requests for webpages, webpage content, email messages, chat messages, social media information and communications, video data, audio data, file transfers, and similar. General data 146 flows bidirectionally between the mobile communications devices 30 and the WLAN 22.

The communications routing system 42 communicates with the mobile communications devices 30 via the WLAN 22. In this way, SMS data 140 and general data 146 can be communicated between the communications routing system 42 and the mobile communications devices 30. In some implementations, such as that depicted, call control 142 and call data 144 are communicated between the WLAN 22 and the VoIP service 40, bypassing the communications routing system 42. In other implementations, call control and/or call data can flow through the communications routing system 42.

Authentication information 148, such as log-in credentials, session identifiers, and the like, is also communicated between the communications routing system 42 and the mobile communications devices 30. This allows only authorized mobile communications devices 30 to access the communications routing system 42 and provide for identity verification of users of the system.

The communications routing system 42 communicates with the mobile network 20 using the Internet Protocol via the interoperation service 64. The communications routing system 42 can be configured to perform any necessary format conversion of SMS data 140 and general data 146 received via the WLAN 22 for transmission to the mobile network 20 as SMS data 150 and general data 156 in formats intelligible by the mobile network 20. Conversely, the communications routing system 42 can be configured to perform any necessary format conversion of SMS data 150 and general data 156 received via the mobile network 20 for transmission to the WLAN 22 as SMS data 140 and general data 146.

The communications routing system 42 can be configured to determine whether an outgoing SMS (or MMS) message contained in SMS data is directed to a mobile communication device 30 having an account with the communications routing system 42. This can be achieved by checking the destination phone number against the databases 44, 76 (FIG. 1). The communications routing system 42 stores SMS/MMS messages and sends push notifications 180 to destination mobile communications devices 30 to fetch stored messages, when the destination phone number is present in the user data databases 76. The communications routing system 42 directs outgoing SMS message as SMS data 150 to the interoperation service 64 when the destination phone numbers not present in the user data databases 76. The interoperation service 64 sends such messages as standard SMS messages 190 to the destination mobile communication device 188.

Authentication and usage information 90 can also be communicated between the communications routing system 42 and the mobile network 20. This allows only the communications routing system 42 to control access to the mobile data service 160. Authentication information, such as a session identifier and an authentication key, can be used. Usage information can include data usage amounts for each MDN assigned to the mobile communications devices 30. In some embodiments, the communications routing system 42 stores a maximum allowable data usage amount for each mobile communications device 30, and initiates a deactivation process with the mobile network 20 for any mobile communications device 30 that is determined by the communications routing system 42 to have exceeded its maximum allowable data usage amount.

Call control commands 162 and call data 164, which are similar to commands 142 and data 144, can flow between the VoIP service 40 and the mobile network 20 for communications devices 30 connected to the mobile network 20.

The communications routing system 42 can also be configured to receive call information 166 from the VoIP service 40. Such call information 166 can include call connection information and polls. The communications routing system 42 can store call connection information (e.g., call completed, call ended, missed call, etc.) in the user data database 76 to track call histories. The VoIP service 40 can be configured to poll the communications routing system 42 when a call is requested, so that the communications routing system 42 can send a push notification 180 to the destination mobile device 30 to notify the user at the destination mobile device 30 of the incoming call. The destination mobile device 30 registers with the VoIP service 40, which then passes relevant call connection information 166 to the communications routing system 42.

The mobile communications devices 30 are configured to communicate with the mobile network 20 over the mobile data service 160. Data can be allocated to each mobile communications device 30 using mobile-network identifiers (e.g., MDN). Alternatively, data can be collectively allocated to all mobile communications device 30 and tracked, metered, or limited using mobile-network identifiers (e.g., MDN). SMS/MMS data 170, call control commands 172, call data 174, and general data 176 can be communicated between the mobile communications devices 30 the mobile network 20. Such data 170-176 can be in the same format as the data 140-146 communicated via the WLAN 22. Advantageously, mobile data service 160 provides only data, as opposed to data and circuit-switched services (e.g., voice minutes and SMS) which can simplify operation of the system and increase efficiency.

The communications routing system 42 can be configured to calculate and/or store call length (e.g., in minutes, seconds, etc.) from call information 166 received from the VoIP service 40. In some implementations, call information 166 includes call length.

In some implementations, prepaid balances of the mobile communications devices 30 are reduced based on call data 164, 174 routed through the mobile network 20, while prepaid balances are not reduced based on call data 144 routed through the WLAN 22. The VoIP service 40 can be configured to request the communications routing system 42, as call information 166, to determine whether a call should be connected or be allowed to continue, as the case may be. Periodic requests can be made for calls in progress. The communications routing system 42 can be configured to end or deny call when a particular calling party's balance is depleted. In some implementations, calls can be permitted via the WLAN 22 irrespective of balance depletion.

The communications routing system 42 can be configured to provide push notifications 180 to the push notification service 28 in response to call control commands requesting initiation of new calls. Such a push notification 182 is issued by the push notification service 28 to the receiving party's mobile communication device 30, which contains the phone module 124 that is configured to perform a SIP registration is response to such trigger. Push notifications 182 can arrive as data 146 via the WLAN 22 or as data 176 via the mobile network 20, depending on how the destination mobile communications device 30 is available.

The other mobile communications devices 188 do not have accounts with the communications routing system 42 and thus connect to the mobile network 20 (or another mobile network) as is known. Hence, SMS messages 190, call control commands 192 voice calls 194 and general data 196 can be communicated between the mobile communications devices 188 and the mobile network 20.

As should be apparent from the above, communications 90, 140-148, 150-156, 162-166 and 180-182 are generally performed using the Internet Protocol, that is, in the IP domain 198. Such communications can be facilitated by the wide-area IP network 24 (FIG. 1) or similar IP network. Communications 170-176 and 190-196 between the mobile communications devices 30, 188 and the mobile network 20 can be performed according to other standards and protocols.

In view of the above, it should be apparent that the advantages of the communications routing system 42 include centralized routing and tracking of all communications of the mobile communications devices 30, where such communications are performed in the IP domain to the extent possible. In addition, mobile charges need only be tracked for usage via the mobile data service 160, which can simplify metering and billing. Voice call metering and billing can be based on data usage as measured at the mobile network 20, VoIP call minutes as measured at the VoIP service 40, or a combination of such. Further, data usage need not be tracked or metered when conducted over the WLAN 22, as such data is offloaded to the operator of the WLAN 22. This can simplify the system and lead to greater efficiency.

Figure 6:
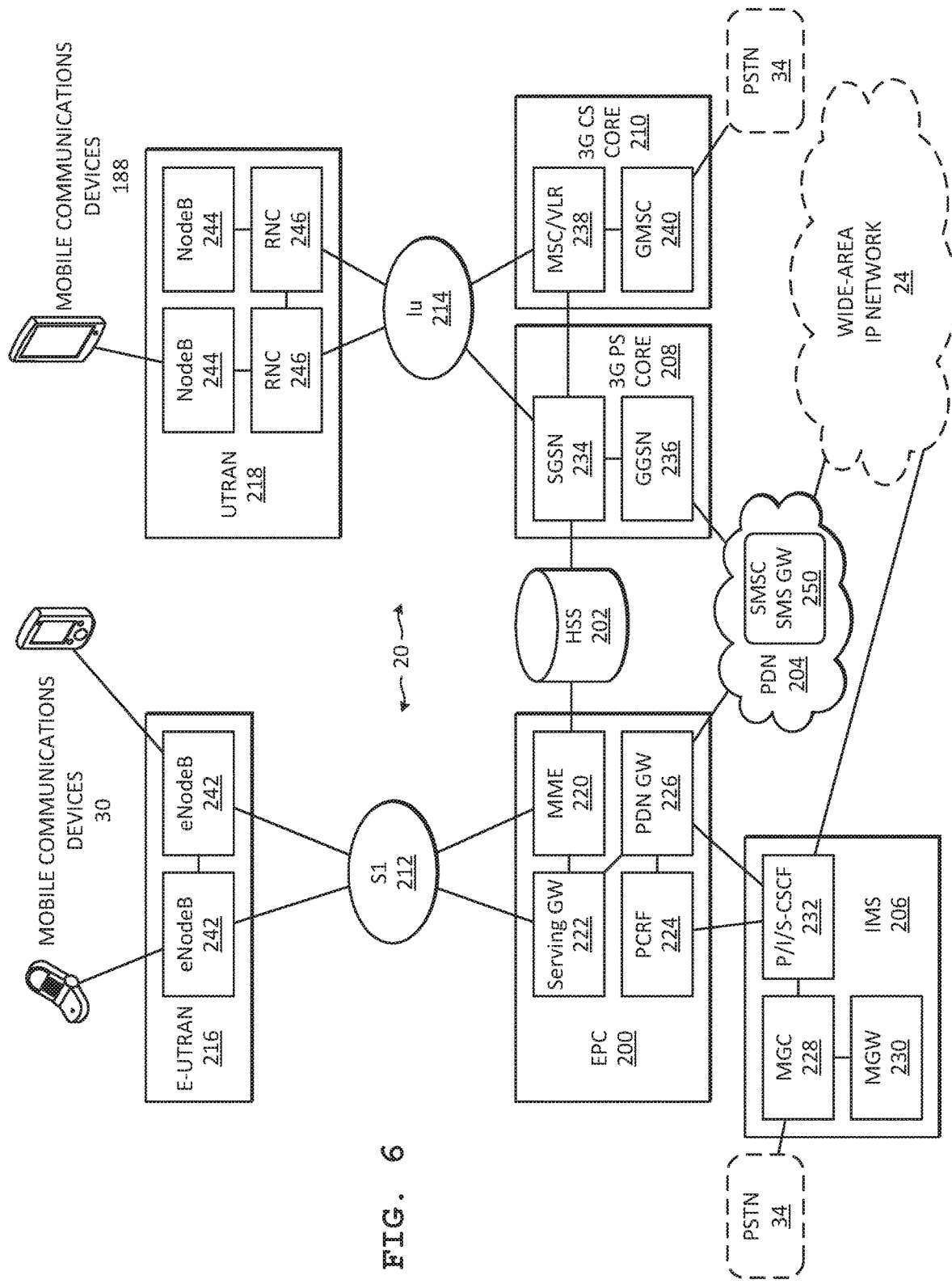
FIG. 6 is a diagram of an example mobile network used in the overall system.

FIG. 6 shows an example of the mobile network 20 according to some implementations. The mobile network 20 can be taken as representative of those operated by Sprint Corporation of Overland Park, Kans., and other carriers.

The mobile network 20 includes an Evolved Packet Core (EPC) 200, a Home Subscriber Server (HSS) 202, a Packet Data Network (PDN) 204, an IP Multimedia Subsystem (IMS) 206, a 3G Packet Switched Core 208, a 3G Circuit Switched Core 210, an S1 Interface 212, an Iu Interface 214, an Evolved Universal Terrestrial Radio Access Network (E-UTRAN) 216, and a UTRAN 218.

The EPC 200 represents the core LTE network and is configured for the overall control of the mobile communications devices 30 and establishment of bearers. The EPC 200 includes a Mobility Management Entity (MME) 220, a Serving Gateway 222, a Policy Control and Charging Rules Function (PCRF) 224, and a Packet Data Network Gateway (PDN GW) 226.

The MME 220 is configured for subscriber and session management including security procedures, device-to-network session handling (e.g., setting up packet data context, negotiating QoS, etc.), and idle device location management.

The PCRF 224 is configured to manage service policy and charging. The PCRF 224 can be configured to allow or deny incoming media requests of the mobile communications devices 30 with the IMS 206, select or initiate a PDP context for each incoming request, and enforce resource limits. The PCRF 224 can also be configured to execute operator-defined charging rules for service data flow based on, for example, application, type of stream (e.g., audio, video, etc.), data rate, and the like.

The PDN GW 226 includes an interface for the EPC 200 to communicate with one or more IP networks, such as the PDN 204 and the wide-area IP network 24. The PDN GW 226 can be configured to allocate IP addresses to mobile communications devices 30, manage access charges and permissions for mobile communications devices 30 to access the wide-area IP network 24, and perform user-based packet filtering and inspection.

In the example shown, the mobile network 20 includes the PDN 204 that connects the PDN GW 226 to the wide-area IP network 24. The PDN 204 can be controlled by the operator of the mobile network 20 and can serve local webpages and other information to a mobile communications device 30 regardless of whether the mobile communications device 30 is permitted to access the wide-area IP network 24.

The PDN GW 226 and the PDN 204 form the interface for communication of data 150, 156 with the communications routing system 42 via the interoperation service 64, and for communication of notifications 182 from the push notification service 28, respectively (FIG. 5).

The HSS 202 stores and manages user subscription information, providing services to the EPC 200 and the 3G Cores 208, 210 for handling calls and sessions. The HSS 202 is configured to store and update a database containing user subscription information, including user identification and addressing information such the IMSI and MSISDN (a.k.a., mobile telephone number). Such database can further contain user profile information such as service subscription information and user-subscribed Quality of Service (QoS) information (e.g., bit-rate limits, traffic class). The HSS 202 can further be configured for generating security information from user identity keys for mutual network-terminal authentication, radio-path ciphering, and integrity protection, so as to ensure data and signalling transmitted between the EPC 200 and the mobile communications devices 30 is secure.

The IMS 206 is a framework for delivering IP multimedia services to the mobile communications devices 30 via the UTRAN 218 and the E-UTRAN 216. The IMS 206 includes a Media Gateway Controller (MGC) 228, a Media Gateway (MGW) 230, and various Call Session Control Functions (CSCF) 232, such as a Proxy CSCF (P-CSCF), a Serving CSCF (S-CSCF), and an Interrogating CSCF (I-CSCF), which can include, respectively, a SIP proxy, a SIP server and controller, and a SIP interrogating function. The MGC 228 includes a SIP endpoint configured for call control protocol conversion between SIP and protocols (e.g., ISUP and BICC) used by the PSTN 34. The MGC 228 controls the resources of the MGW 230. The MGW 230 is configured to convert the different transmission and coding techniques used in the PSTN 34 and in the EPC 200 and wide-area IP network 24. The IMS 206 is the interface for communicating VoIP call data 164 with the VoIP service 40 (FIG. 5).

The 3G Packet Switched Core 208 includes a Serving GPRS Support Node (SGSN) 234 and a Gateway GPRS Support Node (GGSN) 236. The SGSN 234 is configured as the interface between the radio system and the fixed network for packet-switched services, and to handle packet transmission to/from the relevant mobile communications devices 188 (FIG. 5). The SGSN 234 stores subscription and location information, including the cell or routing area, for each relevant mobile communications device 188. The GGSN 236 is configured as a gateway between a GPRS wireless data network and other networks, such as the PDN 204. The GGSN 236 stores subscriber data received from the HSS 202 and the SGSN 234, as well as the address of the SGSN 234 where each relevant mobile communication device 188 is registered.

The 3G Circuit Switched Core 210 includes a Mobile Switching Centre and Visitor Location Register (MSC/VLR) 238, as well as a Gateway Mobile Switching Centre (GMSC) 240. The MSC is an interface between the radio system and the fixed network and is configured to handle circuit-switched services to/from the relevant mobile communications devices 188. The VLR includes a database configured to store information about mobile communications devices 188 that are under the jurisdiction of the MSC. The GMSC 240 connects the 3G Circuit Switched Core 210 with the PSTN 34.

The S1 Interface 212 is the interface between the E-UTRAN 216 and the EPC 200. The S1 Interface 212 can be configured for exchange of signaling messages between the E-UTRAN 216 and the MME 220 and for transport of user datagrams between the E-UTRAN 216 and the Serving Gateway 222.

The E-UTRAN 216 contains a plurality of base stations, or eNodeBs 242, that provide for wireless communication with the mobile communications devices 30.

The Iu Interface 214 is configured to carry user traffic (e.g., voice and data) as well as control information between the UTRAN 218 and the 3G Cores 208, 210.

The UTRAN 218 contains a plurality of base stations, or NodeBs 244, which provide for wireless communication with the mobile communications devices 30. The UTRAN 218 further includes Radio Network Controllers (RNCs) 246, which control the NodeBs 244.

The PDN 204 can include SMSC/MMSC and SMS/MMS gateway 250 for receiving SMS/MMS data 150 from the communications routing system 42 via the interoperation service 64 (FIG. 5) for sending as SMS messages 190 destined for the mobile communications devices 188 not associated with the communications routing system 42. Likewise, the communications routing system 42 can access SMS messages 190, via the interoperation service 64, destined for the mobile communications devices 30 via the SMS gateway 250 as SMS data 150.

The techniques discussed above show that evolving mobile network technologies, such as LTE, can be made available to prepaid users in a simplified, efficient, and efficient manner using the Internet Protocol. In addition, a reduced deployment of physical infrastructure is required. Further, more efficient spectrum usage can be realized.

While the foregoing provides certain non-limiting example implementations, it should be understood that combinations, subsets, and variations of the foregoing are contemplated. The monopoly sought is defined by the claims.

What is claimed is:

1. A method for electronic communications, the method comprising:
   receiving, at a Voice over Internet Protocol (VoIP) service, a call request for a call from a source device to a destination device;
   determining, by the VoIP service, whether the destination device is on a public switched telephone network (PSTN) coupled to the VoIP service;
   when the destination device is on the PSTN, routing the call through the PSTN;
   when the destination device is not on the PSTN, routing the call through the VoIP service;
   receiving at a communications routing system coupled to the VoIP service, call information for the call, wherein at least one of the source device or the destination device corresponds to an account identifier stored at the communications routing system, the call information indicating whether the call is routed through a mobile network or through a wireless local area network (WLAN) and including a call length;
   when the call information indicates that the call is routed through the mobile network, reducing a usage balance for the account identifier based on the call length; and
   when the call information indicates that the call is routed through the WLAN, recording the call length without reducing the usage balance for the account identifier.

2. The method of claim 1, further comprising, when the source device is associated with the account identifier and the usage balance for the account identifier is depleted:
   when the source device connected only to the mobile network, denying initiation of the call; and
   when the source device is connected to the WLAN, allowing the call.

3. The method of claim 1, further comprising, when the destination device is associated with the account identifier and the usage balance for the account identifier is depleted:
   when the destination device is connected only to the mobile network, denying initiation of the call; and
   when the destination device is connected to the WLAN, allowing the call.

4. The method of claim 1, further comprising, issuing, by the communications routing system, a push notification to the destination device.

5. The method of claim 1, further comprising providing, to the destination device, a stored VoIP telephone number as a caller ID for the source device.

6. The method of claim 5, further comprising excluding a stored mobile telephone number from the caller ID for the source device.

7. The method of claim 1, further comprising:
- receiving, at the communications routing system, a periodic request for an ongoing call between the source device and the destination device;
- responsive to the periodic request, determining whether a usage balance for a destination account identifier has been depleted;
- when the determination is affirmative and the destination device is connected only to the mobile network, ending the ongoing call;
- when the determination is affirmative and the destination device is connected to the WLAN, allowing the ongoing call to continue; and
- when the determination is negative, reducing the usage balance for the destination account identifier based on a call initiation time and a most recent periodic request specified in the periodic request and allowing the ongoing call to continue.

8. The method of claim 1, further comprising:
- receiving, at the communications routing system, a periodic request for an ongoing call between the source device and the destination device;
- responsive to the periodic request, determining whether a usage balance for a source account identifier has been depleted;
- when the determination is affirmative and the source device is connected only to the mobile network, ending the ongoing call;
- when the determination is affirmative and the source device is connected to the WLAN, allowing the ongoing call to continue; and
- when the determination is negative, reducing the usage balance for the source account identifier based on a call initiation time and a most recent periodic request specified in the periodic request and allowing the ongoing call to continue.

* * * * *

UNITED STATES PATENT AND TRADEMARK OFFICE
CERTIFICATE OF CORRECTION

| | |
|---|---|
| PATENT NO. | : 11,399,099 B2 |
| APPLICATION NO. | : 17/071409 |
| DATED | : July 26, 2022 |
| INVENTOR(S) | : Ting et al. |

It is certified that error appears in the above-identified patent and that said Letters Patent is hereby corrected as shown below:

In the Specification

1. Column 1, Line 20 in Background:
"... protocols and standards adds ..." should read -- ... protocols and standards add ... --

2. Column 2, Line 10 in Summary:
"...invention,    a communication ..." should read -- ... invention, a communication ... --

3. Column 2, Line 57 in Detailed Description:
"...that are routed, an may be delivered..." should read -- ... that are routed, and may be delivered... --

4. Column 3, Line 23 in Detailed Description:
"...For sake of discussion it is assumed..." should read -- For sake of discussion, it is assumed... --

5. Column 11, Line 7 in Detailed Description:
"... may be only be ..." should read -- ... may only be ... --

6. Column 17, Line 11 in Detailed Description:
"... Signalling..." should read -- ... Signaling... --

Signed and Sealed this
Nineteenth Day of September, 2023

Katherine Kelly Vidal
*Director of the United States Patent and Trademark Office*